July 17, 1934.  F. C. THOMPSON  1,966,874
CHANGE SPEED DEVICE
Filed Feb. 15, 1927
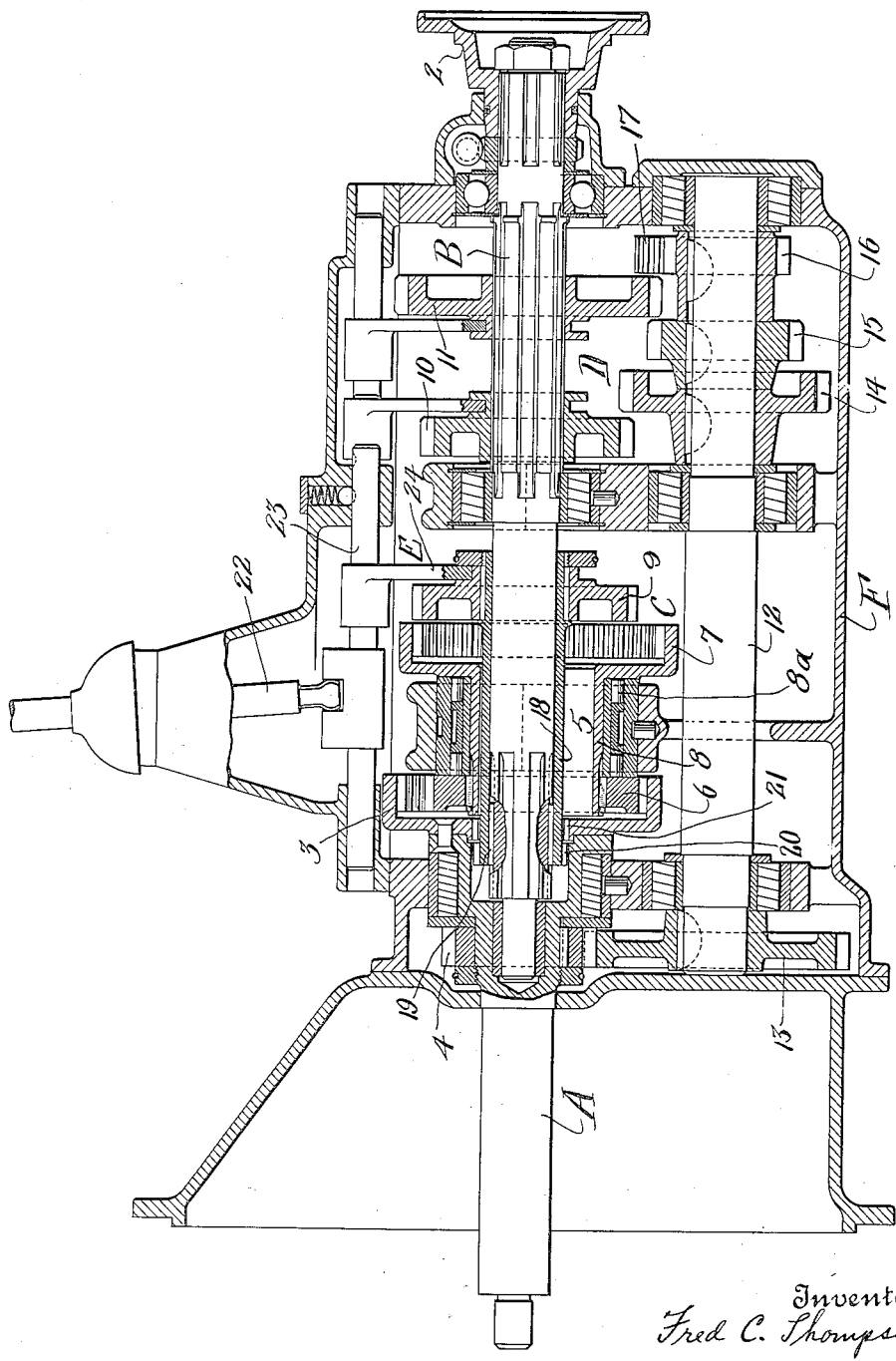
Inventor
Fred C. Thompson
By his Attorneys
Symmestvedt & Lechner Patented July 17, 1934

1,966,874

UNITED STATES PATENT OFFICE 1,966,874

CHANGE SPEED DEVICE

Fred C. Thompson, Detroit, Mich., assignor to Morse Chain Company, Ithaca, N. Y., a corporation of New York Application February 15, 1927, Serial No. 168,276

8 Claims. (Cl. 74—57)

My invention relates to change speed devices and is more especially concerned with change speed devices applicable to motor driven vehicles, in connection with which it will be described. The invention is also applicable to various types of power machinery using change speed devices.

One of the primary objects of my invention is the provision of an improved change speed device employing more than one gear set which is simple to operate and simple in construction.

Another object has to do with the novel arrangement of the gear sets and their associated parts whereby the apparatus is simplified.

How the foregoing, together with such other objects and advantages as will hereinafter appear, or are incident to my invention, are realized is illustrated in preferred form in the drawing, wherein the figure is a sectional elevation through a transmission device constructed in accordance with my invention.

The device, in general, comprises a drive shaft A, a driven shaft B, a gear set C, a second gear set D, a clutch device E, and a casing or housing F.

The particular form of the device shown in the drawing is suitable for use in connection with automobiles, in which instance the drive shaft A is driven by the engine through the medium of a suitable clutch (not shown), and the driven shaft B which is coaxial with the shaft A, is connected to the universal shaft by means of a suitable universal joint, one member of which is indicated at 2.

A driving gear 3 for the gear set C and a driving gear 4 for the gear set D are carried by the drive shaft A, which gears, for the sake of convenience in manufacture, are made as separate parts to be fastened thereto in any convenient manner, although, in some cases, it may be desirable to form them as a compound gear, or to form them directly on the shaft. An antifriction bearing for the shaft A is mounted in the casing F, preferably between the gears 3 and 4. The end of the drive shaft A is made hollow to receive the end of the driven shaft B and a bearing for said driven shaft is provided in said hollow portion.

The gear set C, in this instance, is an overspeed one, including internal and external gears, and the gear set D is an underspeed one, including selective sliding gears of the type commonly used in automobile transmissions.

Referring in detail to the gear set C, it will be seen that it comprises the driving gear 3 which is an internal gear and a compound gear 5 comprising an external gear 6, an internal gear 7, and a hollow shaft 8 having a bearing 8a carried by the casing F, the axis of which is offset to the axes of the drive and driven shafts A and B. The gear set C is completed with the gear 9 which is associated with the clutch device E for a purpose hereinafter appearing. In this connection, it will be seen that with the arrangement of internal external gearing just described, an overspeed device is provided. By reversing the train of gears end for end an underspeed device would be obtained.

The gear set D comprises the driving gear 4, selective sliding gears 10 and 11, a lay shaft 12 having a gear 13 adapted to mesh with the gear 4 and gears 14, 15 and 16, with which the selective sliding gears of the gear set are meshed for obtaining various speed changes, and a reverse idler 17 meshing with the gear 16 of the lay shaft. The gear set D, therefore, has three changes of speed, one when gear 11 is meshed with gear 15, another when gear 10 is meshed with gear 14, and another—reverse—when gear 11 is meshed with reverse idler 17. The gears 10 and 11 may be shifted by any suitable form of shifter mechanism.

Referring now to the clutch device E it will be seen that it comprises a sleeve member 18 which has a splined connection 19 with the driven shaft B and which carries, at one end, the external gear 9 above referred to, and at its other end the clutch teeth 20. By virtue of the spline connection 19, the sleeve 18 can be moved longitudinally of the shaft, but cannot rotate with respect thereto. Internal clutch teeth 21 are provided in the hollow portion of the drive shaft A with which the clutch teeth 20 of the sleeve 18 cooperate when the sleeve is moved to the right to connect the drive and driven shafts for direct drive, the sleeve being moved by means of a suitable shifting mechanism such as the shift lever 22, shifter bar 23 and fork 24.

In the drawing the clutch device is shown in a position in which the gear set D may be connected for drive by sliding either of the sliding gears 10 or 11 into mesh with its related lay shaft gear or gears. Assuming, now, that the sliding gear 11 is moved to the left and that the clutch device is in the position shown, it will be seen that low speed is obtained, the drive being from the drive shaft to the lay shaft through the gears 4 and 13 and from the lay shaft to the driven shaft thru the gears 15 and 11. The sliding gears, as shown, are in their neutral position, and it will be seen that with these gears in such position and with the clutch device in the position shown, the entire transmission device is in its neutral position. In this connection, it will be noted that when the shafts are connected for direct drive or for drive through the gear set D, the gears of the gear set C run idle.

When it is desired to obtain drive through the medium of the gear set C the sleeve member 18 is moved to the extreme left position, which causes the gear 9 to mesh with the gear 7, thus connecting the shafts A and B through the medium of the gearing of this gear set. In this position of the clutch device, the clutch teeth 20 and 21 are, of course, disengaged. Thus, overspeed drive is obtained.

From the foregoing, it will be seen that by virtue of the novel arrangement of parts described, a very compact and reliable change speed device is provided, the operation of which is very simple. The device may be connected to obtain the various drives mentioned by the operation of a single clutch device having a position for connecting the shafts for direct drive, a position enabling drive through the medium of the gear set C and a position for enabling drive through the medium of the gear set D.

I claim:—

1. A change speed device comprising, in combination, a drive shaft, a driven shaft, overspeed gearing including an internal drive gear, an external driven gear and a compound external-internal gear connecting said drive and driven gear, and underspeed gearing including a drive gear, selective sliding driven gears and compound gearing connecting the drive gear with a selected driven gear, each set of gearing having its driving gear carried by the drive shaft.

2. In a transmission, aligned driving and driven shafts, an eccentric gear ring surrounding said driven shaft, gearing between said driving shaft and said gear ring to speed the latter above the former, a sleeve within the gear ring and slidable axially and non-rotatably on the driven shaft, cooperating clutch means on said driving shaft and sleeve to drive said driven shaft from said driving shaft in direct speed, cooperating gearing means on said gear ring and sleeve to drive the latter and the driven shaft in overgear, together with a countershaft, constantly meshed gearing between said driving shaft and said countershaft and cooperating gearing on said countershaft and said driven shaft to drive the latter in lower speed ranges and in reverse.

3. In a transmission, aligned driving and driven shafts, an eccentric gear ring surrounding said driven shaft, gearing between said driving shaft and said gear ring to speed the latter above the former, a sleeve within the gear ring and slidable axially and non-rotatably on the driven shaft, cooperating clutch means on said driving shaft and sleeve to drive said driven shaft from said driving shaft in direct speed, cooperating gearing means on said gear ring and sleeve to drive the latter and the driven shaft in overgear, together with a countershaft, constantly meshed gearing between the driving shaft and the countershaft and cooperating gearing on said countershaft and driven shaft to drive the latter in the lower speed ranges and in reverse, said last named gearing comprising gears slidable on the driven shaft, whereby all shifting members are slidable axially of the aligned shafts.

4. In a transmission device, a casing, aligned shafts, bearings for each shaft in opposite end walls, an intermediate bearing for the driven shaft within said casing, an eccentric ring surrounding said driven shaft, gearing between the said driving shaft and said ring to speed the latter above the former, end bearings in said casing for said ring, a sleeve non-rotatable and slidable on said driven shaft, means to clutch said sleeve and driving shaft in one position of said sleeve, cooperating gear driving means between said ring and sleeve engageable in a second position of adjustment of said sleeve.

5. In a transmission device, a casing, aligned shafts, bearings for each shaft in opposite end walls, an intermediate bearing for the driven shaft within said casing, an eccentric ring surrounding said driven shaft, gearing between the said driving shaft and said ring to speed the latter above the former, end bearings in said casing for said ring, a sleeve non-rotatable and slidable on said driven shaft, means to clutch said sleeve and driving shaft in one position of said sleeve, cooperating gear driving means between said ring and sleeve engageable in a second position of adjustment of said sleeve, together with a countershaft gearing between said driving shaft and countershaft for constantly driving the latter from the former, and variable speed gearing between said countershaft and said driven shaft.

6. A change speed device comprising, in combination, a drive shaft, a driven shaft, a drive gear carried by the drive shaft, a driven gear carried by the driven shaft, a counter-shaft having a gear meshing with the drive gear and a gear adapted for mesh with the driven gear, the aforesaid gears being external gears, a second drive gear carried by the drive shaft, a second driven gear splined on the driven shaft, one of said second gears being internal and the other external, a compound gear having a gear in mesh with said second drive gear and a gear adapted for mesh with the second driven gear, clutch means on the drive shaft and clutch means associated with the second driven gear, said second driven gear and its clutch means being movable to a position in which direct drive obtains, to a position in which drive obtains through the medium of the second gearing mentioned and to an idle position in which drive may be effected through the medium of the first mentioned gearing.

7. A change speed device comprising, in combination, a drive shaft; a driven shaft; a selective gear set including a drive gear carried by the drive shaft, selective gears carried by the driven shaft, and a lay shaft having a gear in mesh with said drive gear and gears adapted to be meshed by the selective gears; an internal gear set including a drive gear carried by the drive shaft, a driven gear splined on the driven shaft, one of said gears being internal and the other external, and a compound gear having a gear meshing with the drive gear and a gear adapted for mesh with the driven gear; clutch means carried by the drive shaft; and clutch means associated with the splined driven gear, said gear and associated clutch means being movable to a position in which the gear runs idle and in which the clutch means engage the drive shaft clutch means, to a position in which both the clutch means and gear run idle, and to a position in which the clutch means runs idle and the gear meshes with its associated gear of the compound gear.

8. A change speed device comprising, in combination, a drive shaft, a driven shaft, an external gear set having its driving gear mounted on said drive shaft, an internal-external gear set having its driving gear mounted on said drive shaft, clutch means on the drive shaft, and means associated with the driven shaft and internal-external gear set operating to associate the shafts directly by engagement with the clutch means on the drive shaft, said means being movable to a position in which drive may be effected through the medium of the external gear set, and to a position in which drive may be effected through the medium of the internal-external gear set.

FRED C. THOMPSON.